June 8, 1948. G. LOWKRANTZ 2,443,076
SIMULATED DIRECTIONAL GYRO FOR AVIATION TRAINERS
Filed July 28, 1943 3 Sheets-Sheet 1

GUNNE LOWKRANTZ
*INVENTOR.*

June 8, 1948.   G. LOWKRANTZ   2,443,076
SIMULATED DIRECTIONAL GYRO FOR AVIATION TRAINERS
Filed July 28, 1943   3 Sheets-Sheet 2

GUNNE LOWKRANTZ
*INVENTOR.*

BY
ATTORNEYS.

June 8, 1948.  G. LOWKRANTZ  2,443,076
SIMULATED DIRECTIONAL GYRO FOR AVIATION TRAINERS
Filed July 28, 1943  3 Sheets-Sheet 3

GUNNE LOWKRANTZ
*INVENTOR.*

BY
ATTORNEYS.

Patented June 8, 1948

2,443,076

UNITED STATES PATENT OFFICE 2,443,076

SIMULATED DIRECTIONAL GYRO FOR AVIATION TRAINERS

Gunne Lowkrantz, Binghamton, N. Y., assignor to Link Aviation, Inc., Binghamton, N. Y., a corporation of New York Application July 28, 1943, Serial No. 496,460

10 Claims. (Cl. 35—12)

1

The present invention relates to instruments for use in grounded aviation trainers and is especially adapted to be used in trainers of the type described in United States Patents 1,825,462 and 2,099,857, but my invention may be used in other types of navigation trainers as well as for demonstration and other purposes.

It is a principal object of this invention to provide a simulated directional gyro for grounded aviation trainers.

It is another object of this invention to provide a simulated directional gyro which responds to movements of the trainer in simulation of the responses of a real directional gyro to movements of a plane in actual flight.

It is a further aim of this invention to provide a simulated directional gyro for a grounded aviation trainer which has means for simulating the precession of a real directional gyro.

Another object of this invention is to provide a simulated directional gyro for a grounded aviation trainer which has means for varying the rate of the simulated precession.

A further purpose of this invention is to provide a simulated directional gyro having means for setting the index means to any desired position.

Other objects and advantages of this invention will become apparent as the description proceeds, reference now being made to the accompanying figures which show a preferred embodiment of my invention.

The directional gyros used in actual flight and before this invention in trainers of the type being mentioned comprise a mass universally mounted in neutral equilibrium with means for causing the mass to spin at a high rate of speed. The axis of rotation of the spinning mass remains in whatever direction it is set except for the slight precession caused by the friction of the bearings of the instrument, and, to a lesser extent, by the earth's rotation. An azimuth scale is connected to the axis of the spinning mass and, consequently, it remains stationary except for the changes in its position caused by precession. The

2 outer case of the instrument being fixed to the instrument panel of the airplane of course assumes the direction of travel of the plane and, consequently, when the plane changes its direction as in turning the case moves about the azimuth scale and the other parts of the instrument connected to the rotating mass. A suitable index mark is provided upon the face of the instrument and as the plane turns, the movement of the instrument case and index mark with respect to the azimuth scale indicates the fact of change of direction and amount thereof.

The precession of the instrument due to the inherent friction also changes the relation of the rotating mass and azimuth scale to the index mark and indicates an apparent turn of the plane. This precession must be taken into account in actual flight and is done so by the pilot who resets the instrument every ten or fifteen minutes by reference to the magnetic compass. The following description will show that this invention provides means for simulating in a grounded aviation trainer the change in position of the azimuth scale relative to the index mark as a plane turns and also means whereby the precession of a real directional gyro may be simulated. Furthermore, means for resetting the instrument to any desired position will be described.

Figure 1:
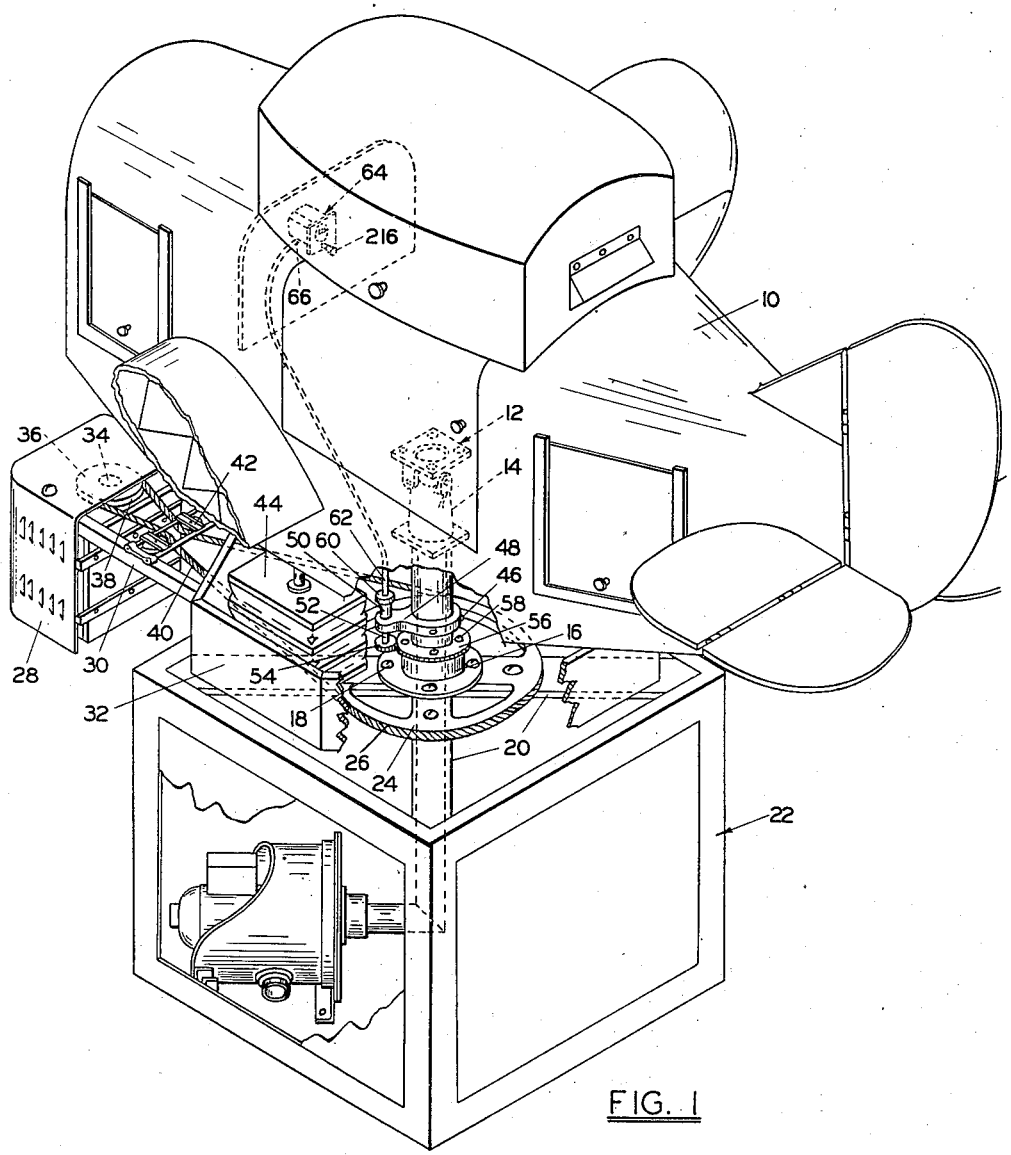
Fig. 1 is a general view of an aviation trainer of the type mentioned and showing the general relation thereto of the simulated gyro of this invention.

In Fig. 1 it will be seen that there is provided a fuselage 10 in which is a seat for a student and controls simulating the regular controls of a real plane. This fuselage is mounted upon the universal joint designated by 12, the central support 14 being integral with the lower part of the universal joint. The lower portion of central support 14 is rotatably mounted in bearing housing 16 which is rigidly affixed by means of bolts 18 to the cross piece 20 which is affixed to base 22. Also affixed to the cross piece 20 is wheel 24 which has an annular groove 26. It should be borne in mind, therefore, that fuselage 10, universal joint 12, and central support 14 are free to rotate with respect to bearing housing 16, cross piece 20, base 22 and wheel 24 which are stationary.

The trainer also comprises a turning motor 28 which is rigidly affixed by means of extending arms 30 to octagon 32 which is affixed to trainer fuselage 10 for rotation therewith. The output shaft 34 of turning motor 28 has rigidly affixed thereupon wheel 36 which has an annular groove 38. Turning belt 40 is placed in the annular groove 38 and in the annular groove 26 of the wheel 24 which is fixed to the cross piece 20 of base 22. The output shaft 34 of turning motor 28 is rotated in response to the pressing of the rudder pedals within the trainer fuselage and inasmuch as turning belt 40 is firmly placed around wheels 24 and 36 by means of belt tightener 42 the friction between wheel 36 and belt 40 prevents slipping therebetween and the same is true of belt 40 and wheel 24. As a result of this friction wheel 36 rolls along belt 40 pulling along with it turning motor 28, extending arms 30, octagon 32, central shaft 14, universal joint 12 and the trainer 10, causing the trainer to turn about its vertical axis in simulation of the turning of a plane in actual flight. Specifically, if the student in the trainer presses the left rudder pedal, the output shaft 34 and wheel 36 are made to rotate clockwise as seen in Fig. 1 and the trainer fuselage 10 turns to the left. On the other hand, by pressing the right rudder pedal within the fuselage 10 these same parts turn in the opposite direction.

By means of a plurality of bellows (only one of which 44 is shown) and a system of vacuum, valves and linkages the trainer fuselage 10 may be made to pitch and bank upon universal joint 12 in simulation of the pitching and banking of a plane in actual flight.

All of the foregoing described mechanisms form no part of the present invention except when combined in combination with my simulated directional gyro to be later described in detail, and therefore, exact details of the construction and functioning are not deemed necessary. However, for a full disclosure thereof reference is made to the two previously-mentioned United States Patents.

Referring still to Fig. 1, it will be seen that affixed to rotatable central support 14 by means of positioning screws 46 is a collar 48 which has mounted therein a sleeve 50. Shaft 52 is rotatably mounted in sleeve 50 and rigidly affixed to the lower end of this shaft is take-off gear 54 which engages with fixed gear 56 which is attached by means of screws 58 to the upper portion of bearing housing 16. The upper end of vertical shaft 52 terminates in gearing housing 60. It will be understood that a turning of the trainer fuselage 10, central support 14 and collar 48 by virtue of the previously-described turning means will cause a rotation of take-off gear 54 and of the shaft 52 upon which it is mounted. Gear housing 60 has suitable means for transferring the rotation of gear 54 to flexible shaft 62 which, as seen in Fig. 1, connects with the simulated directional gyro designated generally by 64.

Figures 2, 3:
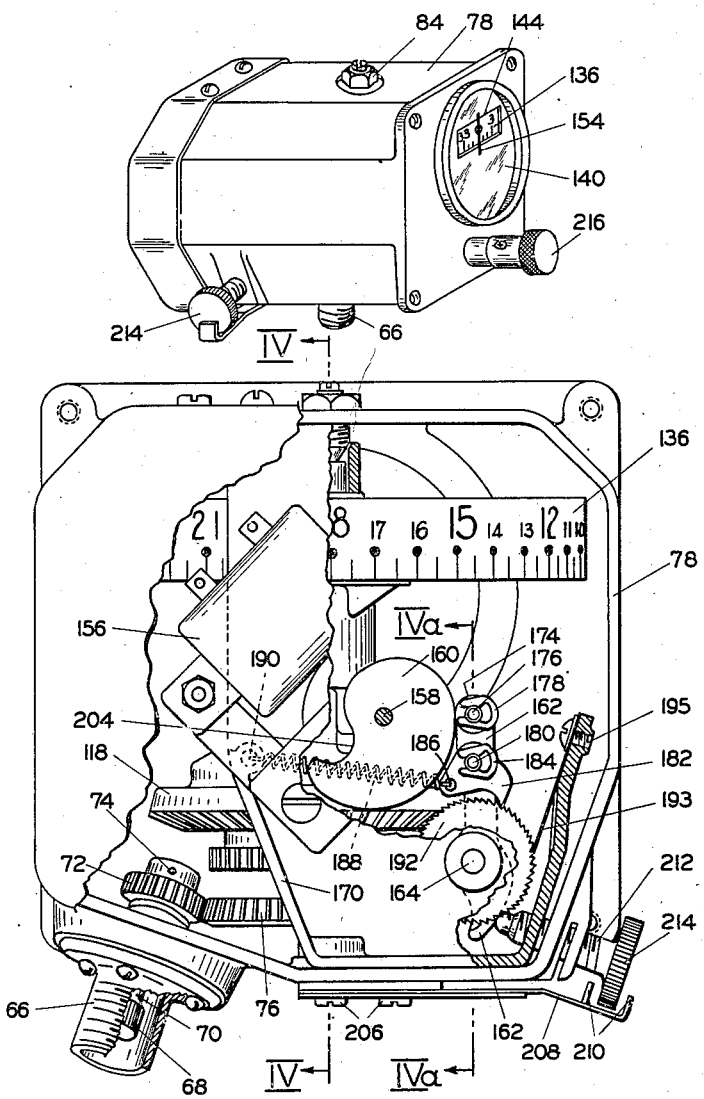
Fig. 2 is a perspective view of the outside of the instrument.
Fig. 3 is a rear view of the simulated directional gyro, certain parts being cut away and other parts being shown in cross section.

Reference is now made to Fig. 3 which shows the inside member 66 of the connector between simulated gyro 64 and flexible shafting 62. A pinion 68 is driven by flexible shafting 62 and the shaft 70 formed integrally with this pinion is therefore simultaneously turned with pinion 68. A bevel gear 72 is affixed to shaft 70 by means of set screw 74 for rotation therewith and this bevel gear rotates a second bevel gear 76 with which it is in engagement.

Figure 4:
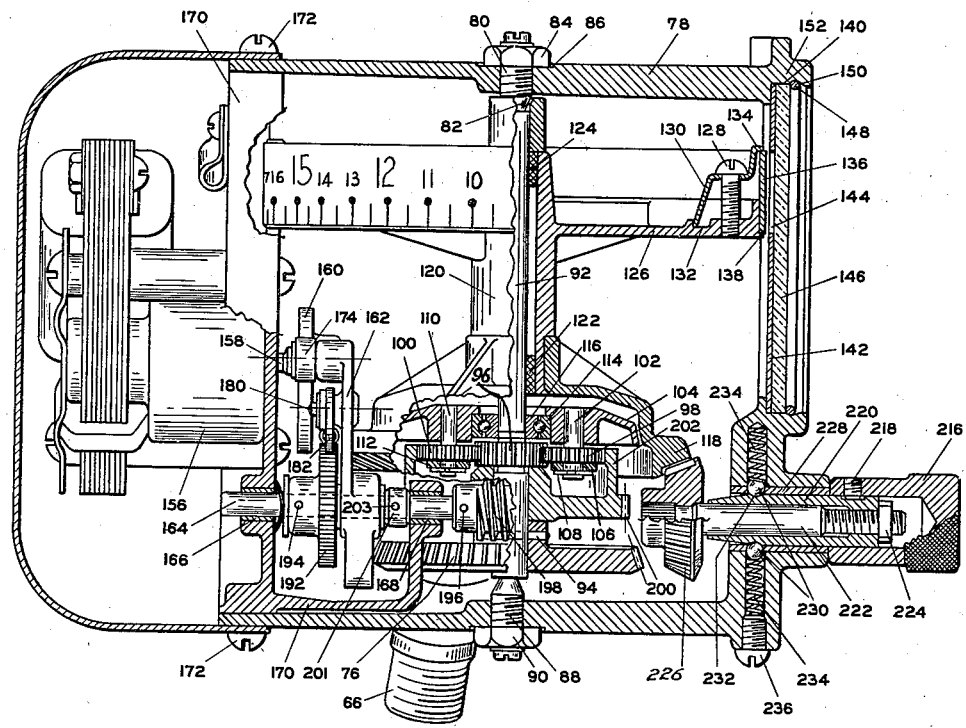
Fig. 4 is a general cross sectional and elevational view of the instrument, the right portion of Fig. 4 being a cross sectional view along the lines IV—IV of Fig. 3 and the left part of Fig. 4 being a cross sectional and elevational view along the lines IVa—IVa of Fig. 3.

Referring now to Fig. 4, it will be seen that the top of main casting 78 is tapped for the reception of stud screw 80, which has a conical lower end 82. A lock nut 84 is placed upon the upper end of stud 80 and in a recess 86 in casting 78. A corresponding threaded stud 88 and lock nut 90 are provided in the bottom portion of casting 78. These two studs position central vertical shaft 92, the upper and lower ends of which are drilled to receive the conical ends of the studs 80 and 88.

Bevel gear 76 which has been previously mentioned is pinned to central vertical shaft 92 by means of pin 94 so that a rotation of bevel gear 76 which results from a rotation of the trainer fuselage 10 will cause a rotation of central shaft 92. A spur gear 96 is formed integrally with vertical shaft 92 and it will be seen that this gear meshes with a pair of spur gears 98 and 100. Gear 98 idles upon a vertical shaft 102 which is rigidly held by inner clutch member 104. A washer 106 and spring clip 108 are placed upon the lower end of vertical shaft 102. Gear 100 likewise idles upon vertical shaft 110 which is also held by inner clutch member 104 and a washer 112 and spring clip (not numbered) are upon the lower end of vertical shaft 110. Outer ball bearing race 114 is pressed in inner clutch member 104 and inner ball bearing race 116 is pressed upon the lower end of vertical shaft 92 so that inner clutch member 104 may rotate freely by means of gears 96, 98 and 100 around central vertical shaft 92.

Outer clutch member 118 is peened to central hub 120 in the form of a hub which surrounds vertical shaft 92. A lower oilite bearing 122 is pressed inside hub 120 as is an upper oilite bearing 124 so that outer clutch member 118, central hub 120, bearings 122 and 124 may rotate about central shaft 92.

Formed integrally with central hub 120 is flange 126 which is tapped for the reception of vertical screws 128 (only one of which is shown). A clip 130 has its lower end in groove 132 and its upper horizontal extension 134 presses down upon azimuth scale 136 which is placed on a shoulder 138 of flange 126.

Whenever the trainer fuselage 10 is rotated about its vertical axis in simulation of the turning of a plane in actual flight the rotation of gear 54 seen in Fig. 1 rotates vertical shaft 52 and the rotation of this shaft, by means of gear housing 60, is transferred to flexible shaft 62 which rotates pinion 68 seen in Fig. 3. Shaft 70 is therefore rotated as is bevel gear 72 and a resulting rotation of bevel gear 76 results. As seen in Fig. 4, a rotation of bevel gear 76 causes a rotation of central vertical shaft 92 and gear 96 which is integral with this vertical shaft. The two idler gears 98 and 100 being in mesh with central gear 96 are rotated thereby and their revolution about shaft 92 when engaged by member 202 causes inner clutch member 104 to rotate about central shaft 92. In the event outer clutch member 118 is in engagement with the inner clutch member it also is rotated as is central hub 120 and flange 126 and azimuth scale 136 rotates inside the instrument housing. The aforedescribed system comprises ratios such that azimuth scale 136 rotates through the exact number of degrees as the trainer is rotated and in the opposite direction. Such being the case, it will be understood that the rotation thus imparted to azimuth scale 136, being equal and opposite to the rotation of the trainer fuselage 10 and instrument housing 78, will exactly offset the rotation of the scale 136 which would otherwise accompany a rotation of the fuselage. Consequently, when the fuselage is rotated, scale 136 remains stationary, and the instrument casing 78 moves there-around.

A counterbore 140 is in the front of casting 78 and rearmost in this counterbore is placed disc 142, which has a rectangular window 144 therein. Glass disc 146 fits in counterbore 140 adjacent metal disc 142 and a snap ring 148 is placed in groove 150 inside the shoulder 152 formed by counterbore 140. A vertical strip of metal 154 is suitably attached to the front side of disc 142 and, as seen in Fig. 2, this strip, which is used as an index mark, is midway in the horizontal extension of window 144. It will be understood that a rotation of the trainer 10, as just described, causes a rotation of the casing 78 and index mark 154 around the stationary scale 136, and, therefore, changes the position of azimuth scale 136 relative to index mark 154, and when the position of azimuth scale 136 relative to index mark 154 is changed, the student in the trainer knows that the trainer is turning. In the event the trainer is turned to the left index mark 154 moves to the right, as seen in Fig. 1, thereby simulating the movement to the right of the index mark on the housing of a real gyro with respect to the azimuth scale when a plane in actual flight is turned to the left. In the event the trainer is turned to the right, index mark 154 is moved to the left in Fig. 4, thereby simulating the relative movements of the index mark and azimuth scale of the gyro in a plane in actual flight when the plane turns to the right. The student in the trainer of course, upon viewing the movements of scale 136 relative to the index mark 154, receives the same intelligence that he would receive were he in actual flight when the same relative movements occur and he uses this information to pilot the trainer in the same manner that he would use it to fly a real plane. It should be noted that scale 136 is graduated so that a movement of the trainer 10 to the right indicates a higher bearing, just as in the case of a real directional gyro in a plane.

It will be seen, therefore, that this invention provides a simulated directional gyro with means for moving the azimuth scale relative to the instrument casing and index mark in response to a turning of the trainer in a manner simulating the relative movements of the azimuth scale and index mark of a real directional gyro in a plane in actual flight to a turning of the plane.

It has been implied that if a perfect directional gyro could be made it would maintain the direction of its axis of rotation in space undisturbed, except for the slight amount of precession in gyros of this kind caused by a rotation of the earth upon its axis. Since, however, it is impossible to completely eliminate friction in the instrument a frictional torque is present and causes an appreciable precession or creeping of the instrument. The precession in a real directional gyro produces the result that even though the plane be flying perfectly straight a slight movement of the azimuth scale with reference to the index mark of the instrument will occur. In order that this error in the instrument shall not become excessive, about every 15 minutes the instrument is checked with the magnetic compass in the plane and reset if necessary by means of the caging knob usually found under the azimuth scale. The following means have been incorporated in my invention to simulate the precession of a directional gyro and to enable the student in the trainer to reset the instrument periodically as he would do if he were in actual flight.

Reference is made to Figs. 3 and 4 which show precession motor 156 which rotates at the constant speed of four revolutions per minute. The output shaft of this motor is designated 158 and rigidly affixed upon this shaft is cam 160. As seen in Fig. 4, arm 162 is pivotally mounted upon horizontal shaft 164 which extends longitudinally of the instrument casing. This shaft is mounted in oilite bearings 166 and 168 which are pressed in casting 170 which is held in place inside instrument housing 78 by means of screws 172. Upon the upper end of arm 162 is rotatably mounted a roller 174 which, as seen in Fig. 3, is mounted upon shaft 176 and held in place by means of spring clip 178. Below the shaft 176 which holds roller 174 is another shaft 180 which is rigidly held by arm 162 and upon which is pivotally mounted a pawl 182 which is held upon shaft 180 by means of spring clip 184. There is a hole 186 in the left end of pawl 182 as seen in Fig. 3 and tension spring 188 is engaged therein. The other end of this spring is held by a hole 190 in casting 170 to which reference has been previously made. A cog wheel 192 is rigidly mounted upon the previously-mentioned shaft 164 by means of pin 194 and upon the foremost end of shaft 164 as seen in Fig. 4 is rigidly affixed by means of pin 196 a worm 198 which drives worm gear 200 which has an integral upstanding portion 202, the inner upper end of which is geared for cooperation with idler gears 98 and 100 which have been previously described. Gear 200 is free to rotate upon central vertical shaft 92. A positioning collar 201 is held upon shaft 164 by means of set screw 203.

Whenever motor 156 is energized the output shaft 158 rotates as does cam 160 which is rigidly affixed thereupon. When cam 160 reaches such a position that roller 174 is in the depression 204 of cam 160 spring 188 pulls pawl 182 and arm 162 to its leftmost position as seen in Fig. 3 and pawl 182 engages one of the teeth of cog wheel 192. A spring stop 193 held by casting 170 and screw 195 prevents a counterclockwise turning of cog wheel 192 when pawl 182 is pulled to the left in Fig. 3. As the rotation of cam 160 continues the eccentric nature of the cam pushes roller 174 to the right and by means of shaft 176 upon which this roller is mounted the upper end of arm 162 moves in that direction. Pawl 182 being engaged with cog wheel 192 rotates this cog wheel clockwise as seen in Fig. 3 and shaft 164 upon which this cog wheel is rigidly mounted is turned in the same direction. Worm 198 is therefore turned, turning worm gear 200 and its upstanding integral portion 202, the upper inner side of which, it will be recalled, is geared for cooperation with idler gears 98 and 100. The rotation of internal gear 202, through the medium of gears 98 and 100 and shafts 102 and 110, will rotate inner clutch member 104 around gear 96 which is integral with central shaft 92 because gear 76 which is rigidly affixed to upstanding shaft 92 is held in place by the drive through flexible shafting 62 to the heading take-off at the base of the trainer. The rotation of inner clutch member 104 caused by a rotation of member 202 will rotate outer clutch member 118 in the event that the clutch is engaged and a rotation of hub 120, flange 126 and azimuth scale 136 will result. The position of azimuth scale 136 relative to index mark 154 will therefore change in exact simulation of the changing of the relative positions of the azimuth scale and index mark of a real directional gyro as a result of the precession of the instrument.

It will be appreciated, therefore, that my invention provides means for simulating the precession of a real directional gyro.

The rates of precession of directional gyros vary from instrument to instrument and as far as a given directional gyro is concerned, the older the instrument becomes the greater its precession usually becomes. The following means have been incorporated in my invention in order that different rates of precession in real directional gyros may be simulated.

It will be seen in Fig. 3 that there is attached to the bottom of the instrument housing by means of screws 206 an arm 208 which has two upstanding limit pieces 210. A precession adjusting screw 212 is held by casting 170 which is suitably tapped for the reception thereof. Integral with screw 212 is precession adjusting knob 214. The left end of screw 212, as seen in Fig. 3, is rounded and enengages with the lower end of reciprocating arm 162. It will be understood that whenever precession adjusting knob 24 is turned so that screw 212 is in its innermost position, movement to the right in Fig. 3 of the bottom end of arm 162 is limited and, therefore, movement to the left of the upper end of arm 162 and of pawl 182 is likewise limited. Thus, when cam 160 reaches such a position of rotation that tension spring 188 pulls pawl 182 and the upper end of arm 162 to the left in Fig. 3, pawl 182 and the upper end of arm 162 will not be able to travel as far to the left as though precession adjusting screw 212 were not in its innermost position. It will therefore be realized that by positioning precession adjusting screw 212, the amount of rotation of cog wheel 192 for each revolution of precession motor 156 may be regulated and, therefore, the amount of precession as shown by the position of azimuth scale 136 may be varied.

It will therefore be realized that my invention also provides means for varying the rate of simulated precession, thereby making it possible to simulate the precession in different instruments.

It should be noticed that the turning of the trainer rotates gear 96 on shaft 92, and this gear by means of idler gears 98 and 100 rotates inner clutch member 104. The output of precession motor 156 at the same time is applied to idler gears 98 and 100 by means of internal gear member 202 which in turn rotates inner clutch member 104. The rotation of inner clutch member 104 and therefore of azimuth scale 136 is the differential result of the turning of the trainer and the simulated precession, just as in actual flight the movement of the azimuth scale relative to the index mark is the differential result of the turning of the plane and precession of the instrument.

As previously explained, in actual flight the directional gyro must be periodically checked with the magnetic compass and reset if necessary by means of the caging knob usually positioned underneath the azimuth scale. The following means have been provided in my invention in order that this practice may be simulated.

As seen in Fig. 4, a simulated caging knob 216 is affixed by means of set screw 218 upon sleeve 220 which is mounted upon horizontal shaft 222. The right end of shaft 222 is threaded into the right end of sleeve 220 and lock nut 224 is positioned upon the outer right end of shaft 222. A bevel gear 226 is rigidly affixed on the left end of shaft 222 for rotation therewith. An oilite bearing 228 is pressed into a bore in the front face of casting 78 and this bearing has two holes drilled therein 180° apart for positioning balls 230. A groove 232 is formed around sleeve 220 and these balls ride in this groove under the compression of springs 234. A screw 236 holds the lower spring 234 in place.

Fig. 4 shows caging knob 216 in its innermost position which is the position that it occupies when it is desired to change the setting of azimuth scale 136. When in this position, it will be seen that bevel gear 226 engages the bevel gear formed integrally with the lower surface of outer clutch member 118 and that outer clutch member 118, central hub 120, flange 126 and azimuth scale 136 are pushed upward, thereby disengaging the clutch members 104 and 118. A rotation of knob 216 will then rotate bevel gear 226, outer clutch member 118, central hub 120 and azimuth scale 136. After azimuth scale 136 has been set to the proper position by reference to the magnetic compass in the trainer, knob 216 is pulled outward from the instrument housing, bevel gear 226 becomes disengaged from the bevel gear formed integrally with outer clutch member 118 and gravity pulls central hub 120, azimuth scale 136 and outer clutch member 118 downward so that the two clutch members 104 and 118 are engaged.

It will be seen, therefore, that my invention provides a simulated directional gyro having an azimuth scale and an index mark in exact simulation of the azimuth scale and index mark of a real gyro and that the relative movements of the azimuth scale and index mark in a real gyro in a plane in actual flight caused by the turning of the plane may be simulated by my invention which provides means for changing the relative positions of the azimuth scale and index arm of the simulated gyro in response to the turning of the trainer. Furthermore, this invention provides means for simulating the precession of a real gyro and means are provided whereby different rates of precession may be introduced, thereby simulating the various rates of precessions in different directional gyros. My invention also provides means whereby the azimuth scale of the simulated gyro may be set to any desired position.

The foregoing being but a preferred embodiment of my invention in which numerous changes may be made without departing from the substance, I limit myself only by the following claims.

I claim:

1. In a grounded aviation trainer comprising a fuselage having a place for a student pilot and a pair of rudder pedals, a directional gyro simulator comprising an index scale, means connecting said index scale with a member movable in response to the movements of said rudder pedals for positioning said index scale in response to the movements of said rudder pedals, and additional means for positioning said index scale in a predetermined manner simultaneously with the positioning thereof in response to the movement of said rudder pedals.

2. In a grounded aviation trainer comprising a fuselage having a place for a student pilot and a pair of rudder pedals, a directional gyro simulator comprising an index scale, means connecting said index scale with a member movable in response to the movements of said rudder pedals for positioning said index scale in response to the movements of said rudder pedals, in simulation of the apparent movement of the index means of a directional gyro in a plane in actual flight in response to the turning of the plane, and a second means differentially connected with said first means for positioning said index scale in a predetermined manner in simulation of the movement of the index means of a directional gyro in a plane in actual flight as a result of the precession of the instrument.

3. In a grounded aviation trainer comprising a fuselage having a place for a student pilot and a pair of rudder pedals, a directional gyro simulator comprising an index scale, means connecting said index scale with a member movable in response to the movements of said rudder pedals for moving said index scale in response to the movements of said rudder pedals, a second means comprising a source of power for moving said index scale, said second means being operable independently of the movements of said rudder pedals, means for disconnecting said first two driving means, and a third means for manually positioning said index scale when said first two means are disconnected.

4. In a grounded aviation trainer comprising a fuselage rotatably mounted upon a stationary base, a directional gyro simulator comprising an index scale carried in said fuselage, take-off means operated by the rotation of said fuselage with respect to said stationary base arranged to prevent a rotation of said scale as a result of the rotation of said fuselage, and means independent of the rotation of said fuselage for moving said scale in simulation of the movement of the scale of a real directional gyro in a plane in actual flight as a result of the precession of the instrument.

5. In a grounded aviation trainer comprising a fuselage rotatably mounted upon a stationary base, a directional gyro simulator comprising an index scale carried in said fuselage, take-off means operated by the rotation of said fuselage with respect to said stationary base arranged to prevent a rotation of said scale as a result of the rotation of said fuselage, means for moving said scale in simulation of the movement of the scale of a real directional gyro in a plane in actual flight as a result of the precession of the instrument, and means for manually positioning said scale.

6. In a grounded aviation trainer comprising a fuselage rotatably mounted upon a stationary base, a directional gyro simulator comprising an index scale carried in said fuselage, take-off means operated by the rotation of said fuselage with respect to said stationary base arranged to prevent a rotation of said scale as a result of the rotation of said fuselage, and means differentially arranged with said take-off means for moving said scale in simulation of the movement of the scale of a real directional gyro in a plane in actual flight as a result of the precession of the instrument.

7. A directional gyro simulator for instruction in the art of navigation comprising, in combination, a casing; a scale graduated like the scale of a real directional gyro mounted in said casing for relative movement with respect to said casing; a first driving means comprising a direct mechanical connection coupled to said graduated scale and to a movable member located outside said casing for controlling the relative movement between said scale and said casing; and a second driving means comprising a direct mechanical connection coupled to said graduated scale for causing a movement of said index means relative to said casing, to simulate the movement of the index means of a real gyro relative to its casing as a result of precession.

8. A directional gyro simulator for instruction in the art of navigation comprising, in combination, a casing; a scale graduated like the scale of a real directional gyro mounted in said casing for relative movement with respect to said casing; a first driving means comprising a direct mechanical connection coupled to said graduated scale and to a movable member located outside said casing for controlling the relative movement between said scale and said casing; a second driving means comprising a direct mechanical connection coupled to said graduated scale for causing a movement of said index means relative to said casing, to simulate the movement of the index means of a real gyro relative to its casing as a result of precession; and a manually operable member arranged to selectively disconnect said two-mentioned driving means from said scale, whereupon said scale may be manually rotated relative to said casing.

9. A directional gyro simulator for instruction in the art of navigation comprising, in combination, a casing; a scale graduated like the scale of a real directional gyro mounted in said casing for relative movement with respect to said casing; a first driving means comprising a direct mechanical connection coupled to said graduated scale and to a movable member located outside said casing for controlling the relative movement between said scale and said casing; a second driving means comprising a motor mechanically connected directly to said scale for moving said scale relative to said casing, to simulate the movement of the index means of a real gyro; and means for selectively adjusting the rate of movement of said index scale caused by said second driving means.

10. A directional gyro simulator for instruction in the art of navigation comprising, in combination, a casing; a scale graduated like the scale of a real directional gyro mounted in said casing for relative movement with respect to said casing; a first driving means for said scale comprising a differential and a clutch, said clutch being directly coupled to said scale; a second driving means comprising a motor and ratchet and pawl means, said motor being connected to said ratchet and pawl means and said ratchet and pawl means being connected through said differential and clutch to said index scale; manually operable means for adjusting said ratchet and pawl means; and a manually operable member for selectively disengaging said clutch from said index scale and moving said index scale relative to said casing.

GUNNE LOWKRANTZ.

REFERENCES CITED

The following references are of record in the file of this patent:

UNITED STATES PATENTS

| Number | Name | Date |
| --- | --- | --- |
| 1,576,824 | Heath | Mar. 16, 1926 |
| 1,589,174 | Heath | June 15, 1926 |
| 1,617,310 | Sperry | Feb. 8, 1927 |
| 1,701,582 | Mengden | Feb. 12, 1929 |
| 1,825,462 | Link | Sept. 29, 1931 |
| 2,069,285 | Stark | Feb. 2, 1937 |
| 2,093,417 | Carter | Sept. 21, 1937 |
| 2,095,716 | Riberolles | Oct. 12, 1937 |
| 2,099,705 | Reichel | Nov. 23, 1937 |
| 2,099,857 | Link | Nov. 23, 1937 |
| 2,110,869 | Crane | Mar. 15, 1938 |
| 2,226,726 | Kramar | Dec. 31, 1940 |
| 2,249,373 | Alkan | July 15, 1941 |
| 2,283,190 | Crane | May 19, 1942 |
| 2,326,764 | Crane | Aug. 17, 1942 |
| 2,336,436 | Biendorf | Dec. 8, 1943 |
| 2,352,101 | Hutter | June 20, 1944 |
| 2,401,029 | Thompson | May 28, 1946 |